(12) United States Patent
James et al.

(10) Patent No.: US 9,922,550 B2
(45) Date of Patent: *Mar. 20, 2018

(54) REMOTE CONTROL FRAMEWORK

(71) Applicant: Conversant Wireless Licensing S.a.r.l., Luxembourg (LU)

(72) Inventors: Sian James, Cambridge (GB); Neal Harris, Cambridge (GB); John Turner, Ely (GB); Tim Howes, Cambridge (GB)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/198,586

(22) Filed: Jun. 30, 2016

(65) Prior Publication Data

US 2017/0046946 A1 Feb. 16, 2017

Related U.S. Application Data

(63) Continuation of application No. 11/994,016, filed as application No. PCT/GB2006/002395 on Jun. 29, 2006, now Pat. No. 9,406,219.

(51) Int. Cl.
| | |
|---|---|
| *G08C 17/02* | (2006.01) |
| *H04N 21/422* | (2011.01) |
| *G08C 23/04* | (2006.01) |
| *H04M 1/725* | (2006.01) |
| *H04N 21/436* | (2011.01) |

(52) U.S. Cl.
CPC ............. *G08C 17/02* (2013.01); *G08C 23/04* (2013.01); *H04N 21/42204* (2013.01); *G08C 2201/40* (2013.01); *G08C 2201/41* (2013.01); *G08C 2201/93* (2013.01); *H04M 1/72533* (2013.01); *H04N 21/43615* (2013.01)

(58) Field of Classification Search
CPC G08C 17/02; G08C 2201/40; G08C 2201/41; G08C 2201/93; G08C 23/04; H04M 1/72533; H04N 21/43615; H04N 21/42204

See application file for complete search history.

(56) References Cited

U.S. PATENT DOCUMENTS

| | | | | |
|---|---|---|---|---|
| 5,650,831 A * | 7/1997 | Farwell | ............. | H04N 5/44582 340/12.5 |
| 6,144,888 A * | 11/2000 | Lucas | .................... | G05B 15/02 29/463 |
| 6,498,567 B1 * | 12/2002 | Grefenstette | .......... | G08C 17/02 340/10.4 |
| 7,894,474 B1 * | 2/2011 | Bell | ....................... | G08C 19/28 370/466 |
| 2002/0129289 A1 * | 9/2002 | Sato | ...................... | G06F 1/1616 713/340 |

(Continued)

*Primary Examiner* — Mohamed Barakat
(74) *Attorney, Agent, or Firm* — Conversant Wireless Licensing

(57) ABSTRACT

A remote control framework enables a plurality of target devices to be controlled by a plurality of remote control devices irrespective of bearer types. In a preferred embodiment any target device may also act as a control device and any control device may also act as a target device. The framework also enables any application running on any target device to be controlled by any controller device.

21 Claims, 3 Drawing Sheets

(56) References Cited

U.S. PATENT DOCUMENTS

| | | | |
|---|---|---|---|
| 2003/0054794 A1* | 3/2003 | Zhang | H04W 88/04 |
| | | | 455/403 |
| 2004/0187139 A1* | 9/2004 | D'Aurelio | G06F 3/038 |
| | | | 719/328 |
| 2006/0066716 A1* | 3/2006 | Chang | H03J 1/0025 |
| | | | 348/14.05 |
| 2007/0258718 A1* | 11/2007 | Furlong | G08C 17/02 |
| | | | 398/106 |

* cited by examiner

REMOTE CONTROL FRAMEWORK

CROSS-REFERENCE TO RELATED APPLICATIONS

This application is a continuation of U.S. patent application Ser. No. 11/994,016 filed on Jun. 29, 2006 which claims the priority of PCT/GB2006/002395 filed on Jun. 29, 2006, which claims priority to GB 0513312.9 filed on Jun. 29, 2005, the entire contents of which are hereby incorporated in total by reference.

BACKGROUND OF THE INVENTION

The present invention relates to a method for enabling the remote control of devices.

For the avoidance of doubt, in the following description of the present invention the term device is used to refer to an entity that is capable of being remotely controlled by any type of external device over any type of wired or wireless connection.

The first demonstration of wireless remote control was by Nikola Tesla, who exhibited a radio controlled boat on a specially built pond at an electrical exhibition in Madison Square Gardens in 1898. U.S. Pat. No. 613,809 was issued on this invention.

Despite this venerable pedigree, the commercial exploitation of remote control technology for domestic electrical and electronic appliances did not occur in earnest for about another 50 years, when it was eventually pioneered by Zenith in connection with televisions. Their first television remote control, the 'Lazy Bones', appeared in 1950, and this was connected to the television by means of a long wire. Whilst wired remote controls for televisions were not a long-lived technology (principally because users kept tripping over the cord), they have always continued to be manufactured for many other types of electronic appliances, from traditional wired remotes such as those for slide projectors and dictaphones, to more modern appliances such as digital camcorders: the Sony RMVD1 is a recent example of this latter art.

It is wireless remote controls that now comprise the majority of such devices. In 1955, Zenith's 'Flashmatic' was the first wireless television remote control to appear; it operated by means of visible light signals made to photo-electric cells on the television. The following year, Robert Adler's 'Space Commander' became Zenith's first truly practical wireless remote control; it was a mechanically operated ultrasonic device. Ultrasonics remained the basis of remote control technology until the development of infrared transmission devices in the 1980s. Infrared remains the technology of choice for remote control devices today, though RF (Radio Frequency) is commonly used in cases where the line-of-sight communication required by infrared is impractical.

Although wireless remotes are still the more common variety, it is noticeable that wired remotes are making something of a comeback, especially on appliances for which wires are needed in any case; the clearest example of this is appliances with audio functionality. This includes mobile phones, which can be controlled via buttons in a module inserted into the audio lead on hands-free headsets, and in a rather more sophisticated form on top-end digital music players (all the market leaders such as the Apple iPod™, the Creative Zen™, and the iRiver™ have optional or integral wired remote controls).

In summary, the remote control of modern electrical and electronic appliances is today extremely widespread in any situation where close physical proximity between the person seeking to operate the appliance and the appliance itself is either

- impossible; as in the case of model vehicles such as aeroplanes or ships
- awkward; as in the case of appliances such as air conditioners that are usually mounted in a high position on a wall or a ceiling
- inconvenient, because it requires a physical alteration or effort which is deemed inappropriate for the circumstances of use; as in the case of modern audiovisual and audio appliances such as televisions, DVDs and music players.

Until recently, the technology for remote control of appliances was limited in a number of related ways:

Remote control devices were manufactured and sold with the appliances which they were intended to control, and closely coupled to them; proprietary signals and protocols were used for communications. This is true even of infrared devices. Although there is a standard for infrared communication developed by the Infra-red Data Association (IrDA, see http://www.irda.org/), it is not utilised by remote controls. There are in fact "many different coding systems in use and generally different manufacturers use different codes and different data rates for transmission." (from http://www.epanorama.net/links/irremote.html).

It should be noted in this context that the existence of programmable remote controls, which can be used with appliances from many different manufacturers, is not evidence that they all conform to a common standard. Such programmable devices are able to emulate the operating modes, transmission protocols, data rates and control codes of each of the various manufacturers rather than being able to run in a single mode that functions in all situations.

The remote controls appliances were supplied with were all dedicated and non-expandable devices; they had a fixed set of capabilities and were not able to perform any functions except those embedded at manufacture time.

Similarly, all appliances that were to be controlled remotely had to be specifically designed for this; their capabilities were fixed and they were not able to perform any functions except those embedded at appliance manufacture.

However, electronic appliances are increasingly becoming multifunctional and programmable; the trend is for them to be built around the same type of central processing units and memory that are employed in general-purpose computers. There is substantial evidence that where this is the case, it is increasingly possible to circumvent the limitations described above.

In the domain of remote control technology, appliances that are built around the same processor and memory components that are used in programmable computers are generally now able to utilise standardised communication technologies. Among these standards are:

Bluetooth (see the Bluetooth Special Interest Group web site at http://www.bluetooth.com/). This is a low-power short-range wireless networking protocol which is implemented in various profiles designed to be used in specific situations. One of the most common uses of Bluetooth is in wireless headsets for mobile telephones, utilising either the handsfree or headset profiles, either of which enable the headset to remotely control the mobile phone.

Firewire/IEEE 1394 (see the 1394 Trade Association web site at http://www.1394ta.org/or the The Institute of Electrical and Electronic Engineers High Performance Serial Bus Bridges Working Group P1394.1 at http://grouper.ieee.org/groups/1394/1/index.html). This is a fast serial protocol running over a wire, which is increasingly being used for remote control of multimedia appliances; the standard includes a Digital Remote Control Command Set.

ANSI/CEA-2027; this is a relatively new standard, being finished as recently as July 2004, and comes from the Consumer Electronics Association (CEA). It defines an interface that can be used for control of audio/video equipment interconnected via a home network using IP (Internet Protocols).

Although there is an increasing use of standards such as these, it is notable that many companies do not utilise them as much as they ought. For example, despite the fact that Apple invented Firewire, they do not use the technology in their own remote controls; people have had to go to some lengths to reverse engineer the proprietary protocols used in the iPod remote control, some of which are described at http://www.maushammer.com/systems/ipod-remote/ipod-remote.html).

As well as the above standards-based technologies, it has also become apparent that where appliances incorporate a programmable digital computer, linking two together enables one to control the other, provided that both are running compatible software. A larger static appliance (such as a personal computer) can therefore be controlled by a smaller mobile appliance (such as a cellular phone), giving in many cases a superset of the functionality of conventional remote controls. Many examples of this technology exist which enable mobile telephones to be used to control media players and other applications on personal computers via Bluetooth, such as Bemuse (http://www.compsoc.man.ac.uk/~ashley/bemused/) and Bluetooth Remote Control (http://www.labtech.epitech.net/remotecontrol/), which both control Windows PCs. Sailing Clicker enables a mobile telephone to control an Apple Macintosh (http://homepage.mac.com/jonassalling/Shareware/Clicker/) while implementations for Linux also exist (such as http://www.iptel-now.de/HOWTO/BT_REMOTE/bt_remote.html).

The prior art as described above shows a gradual progression from dedicated, inflexible and proprietary remote control solutions to versatile, flexible and standard-based ones.

However, all the standards-based solutions described above are limited by the fact that they are specific to bearer technologies, and very often also specific to transport protocols used with that bearer. Those that are skilled in this art will be aware that many possible bearers for remote control signalling exist, including but not limited to:

Bluetooth (using any one of a number of possible profiles);
Wireless Ethernet (802.11), using any IP based signalling method;
Infrared (both proprietary and IrDA);
Proprietary RF solution;
IEEE 1394 (Firewire) utilising either the IEEE 1394 command set or ANSI/CEA-2027;
USB (Universal Serial Bus) including USB-OTG (On-The-Go);
Other wired solutions, including RS-232 serial protocols.

An appliance that is designed to work with a remote control using any one of these bearers is not currently able to work with any of the other types of bearer, irrespective of whether or not the remote control uses standard protocols. An MP3 or other music player designed to be used with its bespoke wired remote control cannot be made to work with a generic Firewire, USB, Bluetooth or Infrared remote control device even though it may have such an industry standard interface available.

Even with remote control devices making use of the same bearer, appliances may fail to work where an incompatible protocol is implemented. For example, it is well known that the Bluetooth headset and handsfree profile are sufficiently different that a Bluetooth enabled mobile phone that only supports the headset profile will not work with a Bluetooth peripheral that only supports the handsfree profile; this type of incompatibility has caused distress to numerous consumers, as there is no easy way of fixing it.

Therefore, it is an object of the present invention to provide a remote control interface which at least alleviates the above mentioned problems caused by the close coupling between remote control solutions and specific bearer technologies through the provision of a generic remote control interface that can be used by application software running on an appliance to receive commands to and from any type of remote control device, irrespective of the protocol or bearer that it might be used to transport those commands.

The same generic software interface can also be used by a remote control device to send commands to an appliance, once again irrespective of any protocol or bearer.

Furthermore, any appliance incorporating a programmable computing device which implements this generic software interface can not only use it to receive commands from a remote control device, but can also use it (in conjunction with a suitable application) to act itself as a remote control device.

SUMMARY OF THE INVENTION

According to a first aspect of the present invention there is provided a method of enabling one or more target devices to be remotely controlled by one or more controller devices through the use of commands sent over at least one of a plurality of bearers including but not limited to:
Fixed wires, including USB and simple serial.
Infrared
Ultrasound
RF, including but not limited to Bluetooth and 802.11 Wireless Networking
through the provision of a generic remote control interface enabling the said one or more target devices to receive commands from any arbitrary controller device over any arbitrary bearer.

According to a second aspect of the present invention there is provided a computing device arranged to operate in accordance with the method of the first aspect.

According to a third aspect of the present invention there is provided an operating system for causing a computing device to operate in accordance with the method of the first aspect.

These and other features of the invention will be more fully understood by reference to the following drawings.

DETAILED DESCRIPTION OF THE INVENTION

In the following description the generic interface of the present invention is referred to as a Remote Control Framework. It can be used by any applications or software running on the appliance; however, the remote control framework internally uses bearer plug-in modules to send or receive external remote control commands. A plug-in can be defined as a replaceable item of executable code that provides specific services to a loosely coupled application or service that can load or invoke it at run-time.

Each unique bearer requires its own plug-in. Each bearer plug-in externally implements the same generic application programming interface (API) but is internally customised to make use of the specific features and requirements of the relevant bearer technology to send and receive commands to and from the remote control device.

Example bearer plug-ins are a Wired Headset, an Infrared remote control, and the Bluetooth audio video remote control profile (AVRCP).

Figure 1:
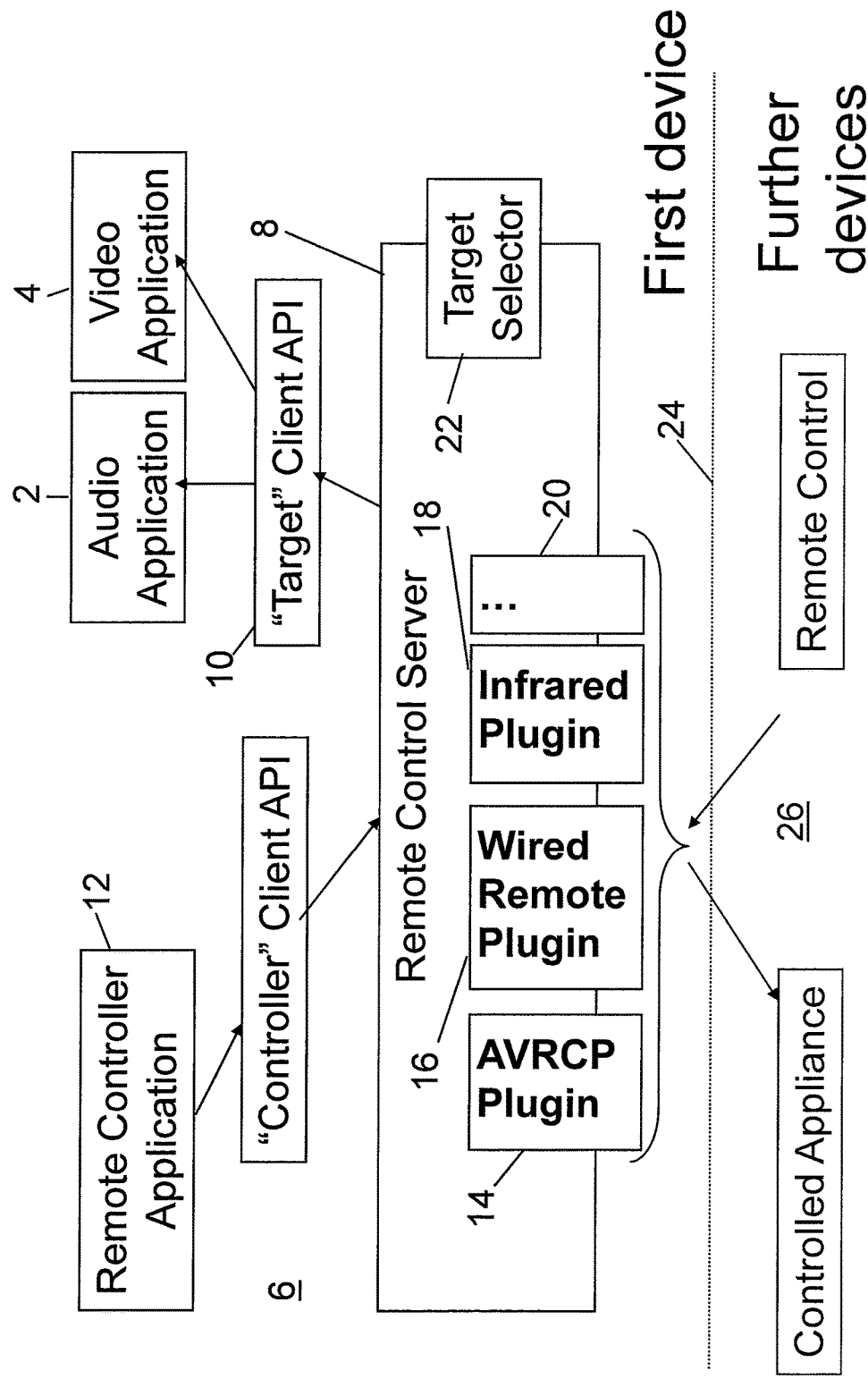
FIG. 1 shows a remote control architecture in accordance with the present invention.

FIG. 1 shows one preferred implementation of this architecture diagrammatically, for an apparatus that is capable of acting both as a remote controller and as a controlled appliance. Implementations of this invention may also encompass alternative devices which encapsulate multiple controller and controlling functions, all of which can be performed concurrently in a discrete reliable and safe manner; multimedia and home security are amongst the technical areas where the complexity of control is such as to warrant devices of this type. However, it should be noted that while this preferred implementation can both control appliances and itself be remotely controlled, this invention can also be implemented in versions which lack either one of these capabilities and are suitable either for dedicated remote controllers, or alternatively for dedicated appliances that require controlling.

The arrows in FIG. 1 show the flow of commands and of control for a typical architecture in accordance with the present invention.

FIG. 1 shows audio application 2 and video application 4 running on an apparatus 6 which is being used as a controlled appliance. These applications receive commands from a remote control server 8 which offers a consistent Target Client API 10 for passing such commands to all applications, irrespective of the remote controller they originate from or the type of bearer used to transport them.

FIG. 1 also shows a remote controller application 12, which can also run on the apparatus when used as a remote controller. This uses its own Controller Client API 14 to send commands via the remote control server 8; once again, this API is consistent for any destination appliance and type of bearer.

The remote control server 8 has plug-ins 14, 16, 18 for AVRCP, a wired remote and Infrared available, with extensions possible, one of which is shown as box 20 in FIG. 1. In this embodiment, the remote control server includes a target selector 22. The target selector performs three roles:
 1) for incoming commands, it determines which target applications should receive the command.
 2) for outgoing commands, it determines the default bearer and appliance to be controlled if the remote control application failed to specify these. Those skilled in the art will be aware that there are many mechanisms (e.g. some type of Control Panel) which can be used by the user or the appliance to determine the default bearer.
 3) for outgoing commands which are sent by a remote control application which specifies the appliance to be controlled, it acts as a gatekeeper; it permits or denies the communication at a level above the bearer.

The dotted line 24 in FIG. 1 signifies the boundary of the apparatus which is implementing this invention. When the apparatus is being used as a controlled appliance, commands are received or 'come in' over this boundary. When the apparatus is being used as a remote control, commands are passed or 'go out' over this boundary. The nature of the bearer for these commands is encapsulated within the remote control server 8.

It should be noted that the further devices 26 shown at the bottom of FIG. 1 may themselves be running the remote control framework, but they need not be; the modules that plug-in to the server can be designed to implement any protocol over any type of bearer.

Adding support for extra remote controls for a controlled appliance is simply a matter of adding additional plug-in modules to the Remote Control Framework on that appliance. So, a USB remote control only requires a USB plug-in (not shown) to be made available to the remote control server; for example in lieu of the extension box 20 in FIG. 1. This may be provided as an installable software module on an open operating system; alternatively, it could be provided as a hardware upgrade, by means such as an over-the-air or service centre upgrade, or a user-insertable module such as an EPROM which would be recognised by the operating system.

Adding the capability to control additional appliances by a remote control is similarly managed by adding plug-in modules to that appliance's own remote control framework.

The example of the present invention which will now be described is an implementation of the invention on a cellular telephone running Symbian OS™, the advanced operating system for mobile phones produced by Symbian Ltd; it therefore uses terms and idioms which will be familiar to those skilled in the art of building devices with this operating system, as described in various textbooks on Symbian OS (such as Symbian OS Explained by J. Stichbury, Wiley 2004, ISBN 0470021306), and in the various development kits published by Symbian Ltd (such as those found at http://www.symbian.com/developer/techlib/sdl.html). Those skilled in the art will of course appreciate that the sample implementation described here can also be adapted to run on many different operating systems and many different devices.

This example Remote Control System (RemCon) shows how the invention can be used to control a phone, and in particular a music application such as an MP3 player running on the phone, from a Bluetooth stereo audio headset. The application being controlled is referred to as a target. For instance, in this example the user may interact with a headset to perform functions such as play, pause, and 'next track': in essence the headset is used for remote control of the phone.

More generally, the phone may be controlled by another device over any suitable bearer or protocol. Therefore, in order to demonstrate the extensibility of the invention, another initial implementation described is that of a relatively basic plug-in which works over a serial transport using an arbitrary naive protocol.

The remote control system of the present invention also allows the use of the device as a remote control for other devices. The application on the device for this functionality is referred to as a controller. For example, the device might be used for the remote control of a television.

The system is extensible in terms of the transports and protocols (collectively known as bearers) which may be used to transmit and receive remote control messages. Although in this description, headsets are generally envisaged as Bluetooth headsets, it is clearly possible to support other types of headsets, such as wired ones.

Independently of bearer extensibility, the system is also extensible in terms of the messages which may be sent and received. Compliance with a new bearer protocol may also involve, therefore, supporting new messages.

The system also allows multiple client applications to use it simultaneously. Not just one controller and one target, but multiple targets at the same time as multiple controllers.

Controller clients send commands and receive responses. Target clients receive commands and send responses. The controller API allows, therefore, connectionless operation (where commands are routed by the system as decided by the device manufacturers) and connection-oriented operation (where the client specifies the bearer and any relevant addressing information for the remote party). Clients can monitor the states of the various connections extant at any point in time. The system is therefore bearer agnostic.

Figure 2:
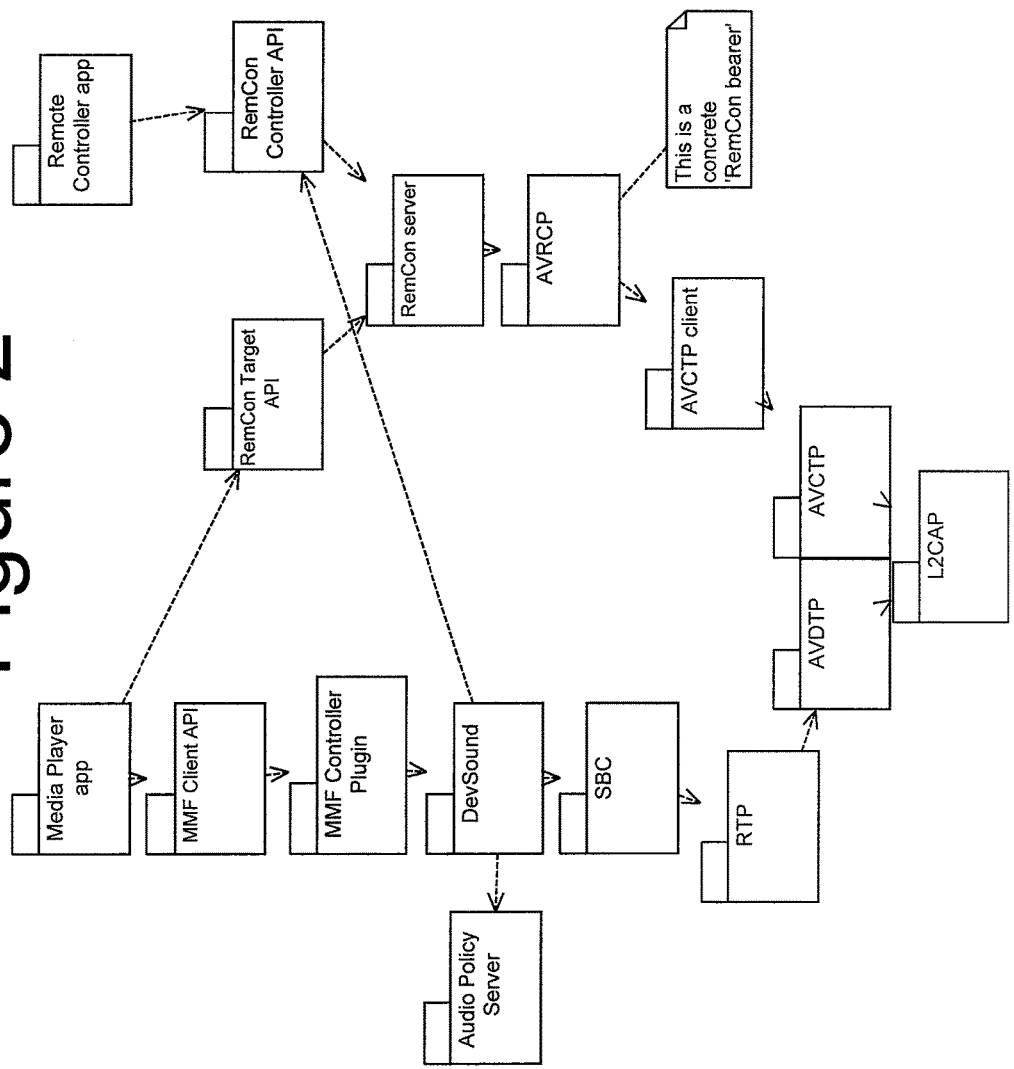
FIG. 2 shows an architectural overview of a remote control architecture in accordance with the present invention.

FIG. 2 shows an architectural overview of the system.

Some of the components in the architecture shown in FIG. 2 implement standard protocols, which are well known to those skilled in the art. These include:
AVCTP (Audio Video Control Transmission Protocol)
AVDTP (Audio-Video Distribution Transport Protocol)
AVRCP (Audio Video Remote Control Profile)
L2CAP (Logical Link Controller and Adaptation Protocol)
RTP (Real Time Protocol)
SBC (Sub Band Codec)

Other components of the architecture shown in FIG. 2 are specific to this implementation.
Media Player app uses a MultiMedia Framework (MMF) to send audio over AVDTP to the Bluetooth headset. The MMF is represented by the MMF Client API and the MMF Controller Plug-in. The Media Player app is also a RemCon target, and receives remote control commands (like next track, pause, etc) from the headset, via AVRCP.
Remote Controller app is a RemCon controller and sends remote control commands to remote devices via AVRCP.
DevSound is also envisaged as a RemCon controller; this is how it sets the remote volume directly via the Audio Policy Server (i.e. the media volume is treated as a system property, not handled on a per-media-player-app basis).
The RemCon Target API and RemCon Controller API include the command extensibility mentioned above.
The RemCon server includes the bearer extensibility framework and the message routing policy also mentioned above.

An overview of the principal components of the design will now be provided.
RemCon
There will be at most a single instance of the RemCon server running on the device. It is a transient server; that is to say, it will not always be in use and, in order to save resources, it shuts down when there are no clients.
Bearers
Bearers are implemented as plug-ins to RemCon and all instantiate a standard interface.

This particular implementation of the remote control system is associated with implementations of the AVRCP and AVCTP extensions to the Bluetooth system. Hence:
AVRCP is delivered as a bearer plug-in to RemCon
AVCTP is delivered as part of the Bluetooth protocol module.

It is also be associated with a reference serial bearer as described above.
The server is designed
a) to work with these components and
b) as far as possible, to work with any other conceivable bearer, i.e. to remain bearer-agnostic.

While there are two possible types of bearer, connection-oriented and connectionless, this implementation requires that connectionless bearers emulate connection-oriented behaviour. The bearer API is therefore connection-oriented, as is the AVRCP bearer plug-in.

Instantiation of a connection-oriented bearer causes it to start listening for incoming connections. Such bearers accept incoming connections and notify the RemCon server.

It should be noted that the RemCon server is also able to command a bearer in order to attempt connection to a specific remote device.
Controllers
Controller entities send messages to remote targets, and field any replies given.

When a controller in connectionless mode sends a command, the actual bearers to be used (and specific connections within those bearers) are specified by a plug-in, normally specific to a device and provided by its manufacturers, known here as the Target Selector Plug-in (TSP); this is discussed in more detail below, in connection with targets. When a controller in connection-oriented mode sends a command, the connection used is that already opened by the controller. The TSP is not bypassed; however, it is able to control whether that controller may send that command to the specified remote at that time.

Bearers are used to transmit commands and receive responses. The server maintains knowledge of commands sent by each controller. Responses coming in over a connection are directed by the server to that controller client which has recently sent the appropriate initiating command over that connection.

The controller API also contains a NotifyConnectionsChange API, which delivers information on all the connections over all bearers in the system.
Targets
As with controller clients, there may be more than one target client operating at once. Target operation is more problematic than controller operation because bearer protocols do not necessarily encapsulate which target an incoming command is intended for. Which target needs to field a particular incoming command changes not only at run-time, but in ways in which the target (client) may have no control, or even knowledge. By way of illustration, if the user is listening to music using an MP3 player application, and a call comes in, which is picked up by the user, the target application (for volume control changes initiated by the headset) changes from the MP3 player application to the phone application. If the device user interface (UI) maintains a distinction between 'Multimedia volume' and 'Call volume', then each of these applications needs to listen for volume control changes in order to update their own on-screen display.

In effect, the system is trying to model what the user thinks is being remotely controlled at any one time. With current practices, this is generally quite straightforward; a user uses a TV remote control to control a TV, and a video remote control to control a video recorder. This makes the mapping between the physical controller and the target explicit.

However, with multiple target applications running on a phone being controlled by a single remote controller(headset), this mapping is more obscure. The following factors are amongst those which may be used to establish the mapping:
 (a) application order in the Read Only Memory (ROM) of the device
 (b) whether or not the application is in the foreground
 (c) recent history of user operations
 (d) relative deemed importance of applications (e.g. for a phone application, when a call is active is probably the most important)
 (e) if the MP3 player knows that a loud section of music has recently started, then a volume down command is more likely to have been commanded for the MP3 player than for any other application
 (f) if the MP3 player remembers and knows that the user generally performs 'next track' soon after the beginning of a particular track in a playlist, the user probably means to skip the next track this time also
 (g) if a user is listening to music streamed off the web from a service which provides a 'user rating' for tracks, and the user selects 'next track' on a track that other users think is not good, the user maybe thinks so too.

The above possibilities, which are merely exemplary, make it clear that it is impossible for a generic operating system to offer a definitive answer to the mapping problem. The manufacturer of the device, who determines the user interface, is therefore often better placed to decide mappings.

Hence, a mechanism is provided, called the Target Selector Plug-in (TSP) which can be used by device manufacturers to implement a set of rules which make best sense according to their user interface system. Thus, the TSP is provided with a list of the current client target process IDs and is expected to indicate back to RemCon (by process ID) a list of target clients to receive the message.

Due to the fact that targets cannot be expected to know which bearer will deliver commands to them, whenever a target client connects to the remote control system, all available bearers must be loaded and start listening for incoming connections. Note that the target client is agnostic towards bearers, but it is not completely unaware of their existence. The NotifyConnectionsChange API previously mentioned is also available to targets.

The Target Selector Plug-in (TSP)
 The TSP is responsible for deciding three things:
 1. for each incoming command, which target(s) to deliver the command to;
 2. for a controller in connectionless mode, which remote target(s) to deliver outgoing commands to (i.e. which bearer/bearer remote address to deliver commands to); and
 3. for a controller in connection-oriented mode, whether to permit or refuse the controller's request to send a specific command to a specific remote.

A single reference implementation of the TSP interface is provided by RemCon. For targeting purposes, this interface is provided with an array of potential recipients. In this way, it is able to indicate an array of intended recipients, and the message will be delivered to each.

As described earlier, the TSP is provided for the device manufacturer to implement according to their own particular interface policy.

In a working device, a single TSP is provided at read only memory (ROM) build time. There is logically only one such plug-in in the system as there is logically only one correct way to answer the question on a device with just one UI. The commands are actually delivered by RemCon; the TSP is merely queried by RemCon so it knows where to deliver the messages.

Target clients are identified for these purposes by process ID and secure ID. RemCon polices the establishment of target clients such that only one is allowed per client process. For each command, the TSP is given a list of the IDs of the currently open target clients so it knows which targets are available. The TSP is also at liberty to trigger the opening of further target client applications, and add their IDs to the array.

Remote targets are identified by a combination of the bearer's Unique Identifier (UID) and a bearer-specific connection information package. Bearer-specific connection packages types should already have been made public to third parties so that connection-oriented controllers are able to function correctly.

The TSP API functions via a request-callback mechanism, for maximum flexibility in its implementation. The callback may be synchronous or asynchronous. The TSP is designed to be capable of understanding any command passed to it by RemCon for addressing, sufficient to fulfil its purpose of addressing the command. This includes not only Core API commands but also extension commands. If the TSP 'errors' a command then that command will not be delivered.

Target Listening Mechanism
 There is only one TSP instance in the system. Therefore incoming events from many bearers are queued in RemCon before being sent across an asynchronous API to the TSP. For targets, once a command has been 'addressed' it is given to those selected target clients, assuming they each have an outstanding receive request.

When the receive request of the target concerned is completed, that target processes the given data and (usually) reposts the request. If the TSP indicates that target X should receive a command when that target has no 'Receive request' outstanding at that point in time, then that command is queued until target X posts a Receive request. Incoming responses are also queued in this way.

Extension APIs
 The framework supports extensions to the core API, for instance to support APIs specific to the various device manufacturers. A controller client does not necessarily know, when sending a command, which bearer it will be sent over. Therefore, the packaging of the command into the bearer-specific format is carried out 'server-side'.

An extension API consists of:
 (a) a client-side DLL (dynamic link library) which provides unique identifiers for the 'new' messages and APIs for sending and receiving those messages, and
 (b) a 'converter' plug-in to each existing bearer plug-in. The server administers these plugins, and fields requests from the bearers to convert messages to and from the bearer-specific format.

If a converter plug-in to convert between a particular bearer format and a particular extension API is not found, then that bearer is not able to process messages from that API and they are dropped.

Converters

A converter is a plug-in, responsible for converting between:
- (a) the message format of one client-side API (whether it is the Core API, or an extension), and
- (b) the message format of one bearer.

Consequently there are in principle N converters in the system, where N is the product of the number of bearers and the number of APIs. In practice N may be less that this, because
- a) an extension API may choose to not support a number of bearers, and
- b) a bearer protocol may be incapable of supporting extensions.

In the description which follows, specific Converters will be named according to the following convention: Converter (A, B) is a converter which converts between API A message formats and bearer B message formats. For instance the RemCon work will provide Converter (Core, Serial) and Converter (ExtApil, Serial), and the AVRCP will provide Converter (Core, Avrcp) and Converter (ExtApil, Avrcp).

Figure 3:
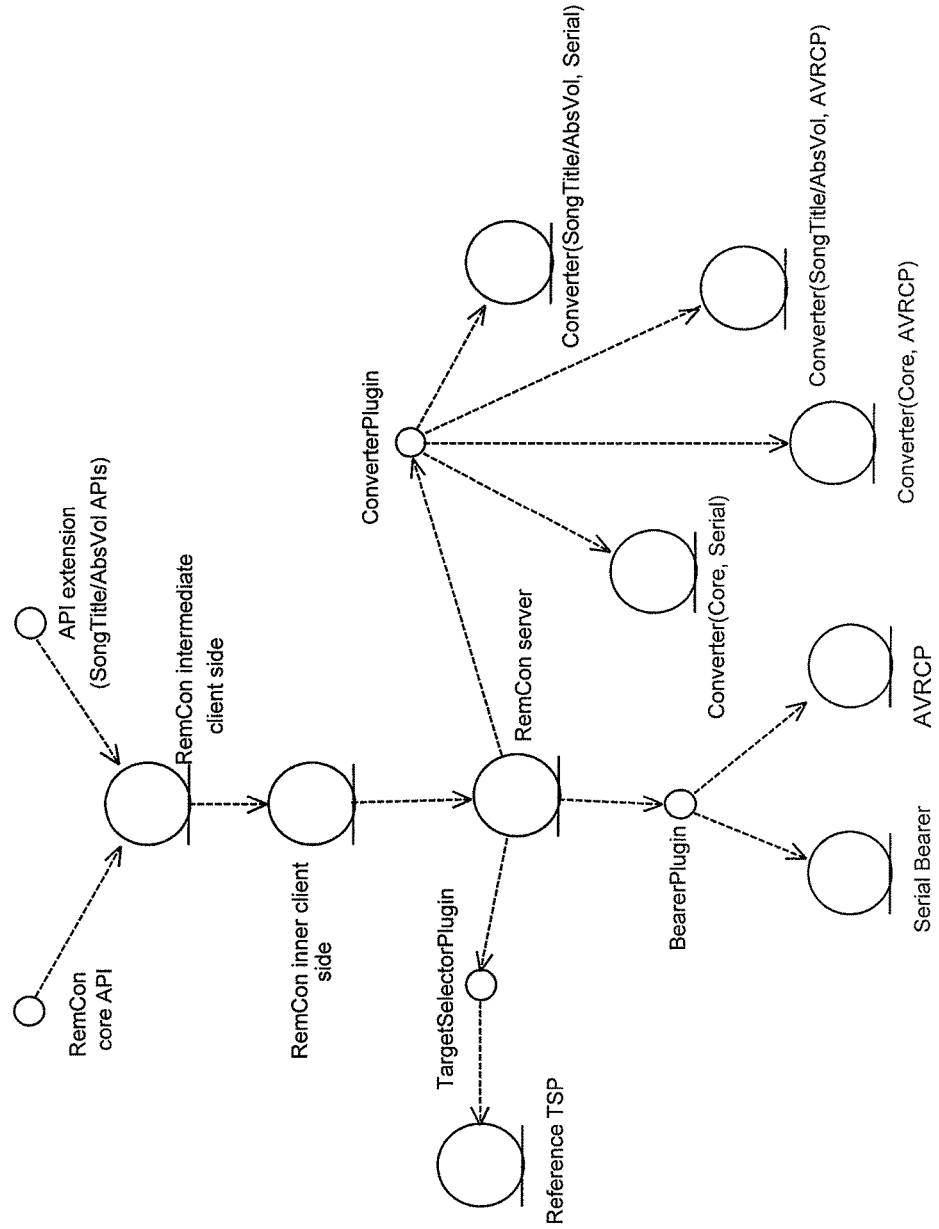
FIG. 3 shows a practical embodiment of a remote control architecture in accordance with the present invention.

A practical embodiment of the invention is illustrated in FIG. 3, where the following executables are shown:
- (a) RemCon Server;
- (b) three Dynamic Link Libraries (DLLs) in the client side API
   RemCom Core API
   RemCon Intermediate client side (the framework for extensions)
   RemCon Client inner client side
- (c) an extension API (ExtaApi1) supplying Song Title and Absolute Volume APIs
- (d) TargetSelectorPlug-in, the base DLL for the TSP
- (e) Reference TSP
- (f) BearerPlug-in, the base DLL for bearer plug-ins, the reference SerialBearer, and the AVRCP Bearer
- (g) ConverterPlug-in, the base DLL for converter plug-ins
   Converter(Core, Serial)
   Converter(ExtApi1, Serial)
   Converter(Core, AVRCP)
   Converter(ExtApi1, AVRCP)

Class definitions for these components may typically be as follows:

RemCon

Class CRemConServer:Public CPolicyServer, Public MRemConTargetSelectorPluginObserver CRemConServer is the concrete server type for the RemCon server. The server owns and controls the command queues. It is the heart of RemCon, dealing with all message routing.

Class CRemConSession:Public CSession2

CRemConSession is the concrete server-side session type.

One instance will be created per client-side RRemCon handle attached.

The session fields all IPC calls from the client side.

It has a member holding the client's process ID. This is used by the session to make sure that at most only one fully instantiated instance of a target session is created per client process.

Objects of this type field client requests, holding RMessage2 members for each such asynchronous API for later completion.

Class CBearerManager:Public CBase, Public MRemConBearerObserver

CBearerManager is a singleton, owned by the CRemConServer.

It loads, on instantiation, all the bearer plug-ins. It is the interface to the bearers.

Bearer

The design of the bearer API, and the design of the reference serial bearer, is described here. Note that each bearer is required to support each and every message in every possible API. It is permissible to do this by returning KErrNotSupported when an attempt to send a message is made, but simply ignoring or dropping a message is not allowed. In practice, the UID identifying the API is used by bearers to forward the message to the correct converter. If there is no converter for that API, then KErrNotSupported is the correct response. If the converter is found but does not (for whatever bearer-specific reason) support the particular message, then KErrNotSupported is given back as a response.

Bearer API

General

Bearers will be plug-ins. A bearer uses converter plug-ins (each bearer has, in principle, one for each extension API plus one for the Core API) to convert each message between the bearer protocol-specific message format and the client-friendly bearer-agnostic message format. If a converter plug-in is not supplied for a particular bearer/API pair, then that bearer will not be able to send or receive messages belonging to that API.

RemCon allows bearers to support multiple simultaneous connections.

Bearers are instantiated on server startup. The instantiation of a bearer causes it to listen for incoming connections. An incoming connection is accepted automatically by the bearer, subject to its own policy. This may include either protocol-specific or other security policies; while it is clearly desirable to ensure that RemCom is secured, this invention does not specify or depend on any particular security model.

RemCon is then notified of the existence of a new connection and relevant (remote address, etc) parameters. Bearers are allowed to support multiplexing, or multiple 'remote control channels'. RemCon is informed by the bearer of the states of any bearer connections.

The bearer API is able to support multiple commands and responses being sent simultaneously. If the bearer is able to support queuing, then RemCon will be able to post many simultaneously-outstanding Send commands on that bearer, on one or more connections. If the bearer does not support queuing, then it must return an error to RemCon, which will complete the client's original request accordingly.

Possibilities for the timing of the completion of a send request include:
- (a) once the bearer has tried to send the request over the transport,
- (b) when the bearer has assumed responsibility for the message, i.e. when the bearer has either sent the request or queued the request for sending, and
- (c) when a response arrives.

For a connectionless controller, once a command has been addressed by a TSP, the resulting addressed message(s) are sent over the relevant bearer connections. If any fails, the particular commanded operation is aborted and the controller client is notified of that error.

RemCon provides no API for querying available bearer plug-ins; this can be achieved using normal operating system (OS) facilities as necessary, because the nature of all plug-ins and the interfaces with which they can be used are public information.

A connection-oriented bearer supporting only one connection at once will start listening when it is created. When it is connected (either by accepting a connection or when driven by a connection-oriented controller) it notifies RemCon of the state of the connection. If the connection is terminated for any reason, the bearer notifies RemCon.

A connection-oriented bearer supporting multiple connections (e.g. AVRCP) will start listening when it is created. If a connection is established using the listener, it will continue to listen for (further) incoming connections. RemCon is kept up-to-date regarding the states of connections.

Connectionless bearers must emulate the connection-oriented behaviour of the bearer API. The serial bearer supports connectionless behaviour and it is able to indicate to RemCon that it is 'connected' when the COM port is opened successfully. If there is a problem opening the port, then it will retry to connect after a pause.

Relevant APIs (Note that lines beginning with '@' document API parameters or return conditions.)

Class CRemConBearerPlug-in:Public CBase

Virtual Void ConnectRequest(Const TRemConAddress& aAddr)=0;

Called by RemCon to get the bearer to connect to another party.

@param aAddr Remote address information.

Virtual Void DisconnectRequest(Const TRemConAddress& aAddr)=0;

Called by RemCon to get the bearer to disconnect from another party.

@param aAddr Remote address information.

Sending Messages virtual Tint SendCammand(TUid aInterfaceUid,
TUint aOperatianId,
TUint aTransactianId,
RBufB& aData,
canst TRemCanAddress& aAddr)=0;
virtual Tint SendRespanse(TUid aInterfaceUid,
TUint aOperatianId,
TUint aTransactianId,
RBufB& aData,
const TRemCanAddress& aAddr)=0;

Called by RemCon to send messages on a connection. The bearer must indicate the completion of the request (i.e. that it has sent the message or queued it for sending) synchronously by return.

@param aInterfaceUid The UID of the client API interface.

@param aOperationId The operation ID within the API.

@param aTransactionId The identifier of the transaction this command or response belongs to.

@param aData API-specific message data. If the bearer returns KErrNone, it is considered by RemCon to have taken ownership of this.

@param aAddr Remote address information.

@return Error.

Note that after accepting a SendCommand request, the bearer is required to generate at least one response (whether genuinely from the remote party or not).

Receiving Messages virtual Tint GetResponse(TUid& aInterfaceUid,
TUint& aTransactionId,
TUint& aOperationId, RBufB& aCommandData,
TRemConAddress& aAddr)=0;

virtual Tint GetCommand(TUid& aInterfaceUid,
TUint& a TransactionId,
TUint& aOperationId,
RBufB& aCommandData,
TRemConAddress& aAddr)=0;

Called by RemCon to pick up a message previously notified to it, by the bearer, using NewCommand or NewResponse.

@param aInterfaceUid The UID of the client API interface.

@param aOperationId The operation ID within the API.

@param aTransactionId The transaction ID of the command or response.

@param aData API-specific message data. Ownership is returned by the bearer.

@param aAddr Remote address information.

Virtual Void ClientStatus(TBool aControllerPresent, TBool aTargetPresent)=0;

This is called by RemCon to indicate whether there are any controller clients present (aControllerPresent) and whether there are any target clients present (aTargetPresent).

It is called both:

(a) when the number of controller clients changes from 0 to 1 or from 1 to 0, and (b) when the number of target clients changes from 0 to 1 or from 1 to 0.

aControllerPresent will be a true value if any controllers are present, and EFalse otherwise. Implementers are reminded not to compare to ETrue.

This API is provided to facilitate the creation and destruction of Service Discovery Protocol (SOP) records by the AVRCP bearer. Failure is not interesting to RemCon, hence the void return type.

Virtual TSecurityPolicy SecurityPolicy( )=0;

@return The capabilities required to use (connect, send, receive) the transport.

RemCon has adequate capabilities to use any conceivable transport, but it is required to check whether controller clients have capabilities. This API is called so that RemCon can police controller client requests. For connection-oriented controllers, the check is performed when the client tries to associate itself with the bearer. For connectionless controllers, the check is performed after the TSP has chosen a particular bearer for the client's transmission.

Class MRemConBearerObserver

CRemConBearerPlug-in has a reference to an object of this type, which it uses to signal completion of requests to RemCon.

Virtual Tint MrcboConnectIndicate(Const TRemConAddress& aAddr)=0;

Called by a bearer when an incoming connection has been established.

@param aAddr Remote address information.

@return Error.

Virtual Void MrcboDisconnectIndicate(Const TRemConAddress& aAddr)=0;

Called by a bearer when a connection has been disconnected from the remote end.

@param aAddr Remote address information.

virtual Tint MrcboConnectConfirm(const TRemConAddress& aAddr, TintaError)=0;

Called by a bearer to indicate completion of an outgoing connection request (CRemConBearerPlug-in::Connect).

@param aAddr Remote address information.

@param aError Error.

@return Error. If this is not KErrNone, the bearer drops the connection.

Virtual Void MrcboDisconnectConfirm(Const TRemConAddress& aAddr, TintaError)=0;
    Called by a bearer to indicate completion of a disconnection request (CRemConBearerPlug-in::Disconnect).
    @param aAddr Remote address information.
    @param aError Error.
Incoming Messages
    virtual Tint MrcboNewResponse(const TRemConAddress& aAddr)=0;
    virtual Tint MrcboNewCommand(const TRemConAddress& aAddr)=0;
    Called by the bearer when a new message is available in its queues to be picked up by RemCon. RemCon will call Get Response or GetCommand.
    @param aAddr Remote address information.
Virtual CRemConConverter& MrcboConverter(TUid aInterfaceUid, TUid aBearerUid)=0;
    Accessor for a converter. The two UIDs given can be used to uniquely identify a converter. Converters are managed by RemCon and merely accessed by bearers via this interface.
    @param aBearerUid The UID of the bearer implementation.
    @param aInterfaceUid The UID of the interface.
Serial Bearer
    The serial bearer is a concrete implementation of the bearer interface.
    CRemConSerialBearer derives from CRemConBearerPlug-in. It owns Active Objects which use RComm::Read and RComm::Write to receive and send data on a serial line—these notify completion through the observer interfaces.
    CRemConSerialBearer opens the comm port on instantiation and immediately indicates 'connect complete' to RemCon. When it receives, from RemCon, a request to Send a command, it packages the API UID and operation UID into a fixed-width buffer (using the appropriate converter) and sends it over the serial line without retry. When the RComm::Write completes, the CRemConSerialBearer is notified, and it calls SendComplete on the observer. When it receives, from RemCon, a request to Receive a command, it queues a RComm::Read for the fixed buffer size. When this is completed, the string is decomposed using the appropriate Converter into an API UID and operation ID, which are notified to the observer via ReceiveComplete.
TSP
General
    The TSP is a plug-in.
Class CRemConTargetSelectorPlug-in:Public CBase
virtual void AddressOutgoingCommand(TUid aInterfaceUid, TUint aOperationId, const TClientInfo& aSender, TSglQue<TRemConAddress>& aConnections, TSglQue<TBearerSecurity>& aBearerSecurity)=0;
    This is called by RemCon to address the given outgoing (i.e. from a connectionless controller) command (aInterfaceUid/aOperationId). aConnections is empty when passed in. The TSP appends zero or more TRemoteAddresses and calls OutgoingCommandAddressed on RemCon.
    The TSP may do this asynchronously. RemCon directs the command to the given bearers with the associated connection information.
Virtual Void PermitOutgoingCommand(TUid aInterfaceUid, TUint aOperationId, Const TClientInfo& aSender, Const TRemConAddress& aConnection)=0;
    This is called by RemCon when a connection-oriented controller tries to send a command. The TSP calls OutgoingCommandPermitted with either ETrue (the send is permitted) or EFalse (the send is not permitted).

Virtual Void AddressI ncomingCommand(TUid aInterfaceUid, TUint aOperationId, TSglQue<TClientInfo >s& aClients)=0;
    This is called by RemCon to address the given incoming command. aClients, when passed in, contains the current set of target clients. The TSP adds or removes zero or more items from this collection and calls IncomingCommandAddressed on RemCon. The TSP may do this asynchronously. The TSP is at liberty to start client applications and add a suitable TClientInfo (populated with at least their process ID) to the collection. RemCon directs the command to the given clients, without assuming that any of them are still extant.
Class MRemCon TargetSelectorPlugin Observer
    Implemented by RemCon.
Virtual Void MrctspoOutgoingCommandAddressed(Tint aError)=0;
    Called by the TSP to indicate that the previous AddressOutgoingCommand request has been answered. (the array passed by reference is correctly populated). NB Only one AddressOutgoingCommand may be outstanding at any time, but more than one of AddressOutgoingCommand and AddressIncomingCommand may be outstanding at once.
Virtual Void MrctspoOutgoingCommandPermitted(TBool alsPermitted)=0;
    Called by the TSP to indicate that it has decided whether the controller send represented by the most recent call to PermitOutgoingCommand is permitted or not.
Virtual Void MrctspoIncomingCommandAddressed(TInt aError)=0;
    Called by the TSP to indicate that the previous AddressIncomingCommand request has been answered (the array passed by reference is correctly populated). It should be noted that only one AddressIncomingCommand may be outstanding at any time, but more than one of AddressOutgoingCommand and AddressIncomingCommand may be outstanding simultaneously.
TClientInfo
    This is a simple type wrapping up the client session's process ID and current send message, which may be used for security purposes.
Client Side
Overview
    The RemCon client side supports sending and receiving commands and responses. It is also extensible. It has three layers, as shown in FIG. 3:
    1. an 'inner' client side, which is nearest to the server, consisting of a single DLL containing RRemCon,
    2. an 'intermediate' layer, consisting of a single DLL, which (a) hands off messages coming from the inner client side to the appropriate 'outer' DLL, (b) provides an abstract interface on which to base API interfaces, and (c) provides the central session creation and control point for the ultimate client, and
    3. an 'outer' layer, consisting of the actual API DLLs. The Core API DLL and the 'extension API 1' DLL (supporting song title and absolute volume messages) are provided in this layer. Third parties may add further APIs in this layer. Each DLL in this layer is uniquely identified by its 'API UID'.
    The inner client side sends and receives generic data. The data consists of an interface UID (associated with a specific outer layer DLL), an ID of an operation within that interface, and any associated data. The interface UID and the operation ID together constitute a unique message identifier.
    Clients link statically to the outer layer DLL(s) they want to use and to the intermediate layer. On initialisation, the client calls a method on the intermediate layer DLL to register an object from the outer layer DLL (by its interface UID) with the intermediate layer. The intermediate layer presents methods for opening RemCon sessions.

When a message is sent by a client, the outer layer DLL adds its interface UID, and the intermediate layer simply forwards this data as a whole to RemCon. When a command is received the TSP decides which target(s) it is to be delivered to. When a response is received RemCon hands it to the controller client that sent the original request. The RemCon server simply delivers the message to the indicated target RRemCon session(s) in the 'inner' client side, which delivers it to the intermediate layer. The intermediate layer analyses the interface UID of the message, and, if it has a registered outer layer object with that UID, it hands the message to that outer layer object. The outer layer DLL analyses the operation ID, optionally decomposes the associated (descriptor) data, and hands the message to the ultimate client via its own API.

Inner Client Side (RRemCon)

The 'immediate' client side is that nearest to the server. It consists of a single R-class, RRemCon, and some auxiliary types.

It is preferable to implement some type of security policing on RemCon abuse or misuse it. This invention is agnostic with respect to any particular security model.

This, the inner layer of the RemCon API, is not accessible to clients.

Class RRemCon:Public RSessionBase

RRemCon is an abstract base class for session types for the client side of the RemCon server. It is used to provide server heap failure debugging APIs in debug builds of the system only. These are not detailed here. The following APIs are available from instances of derived concrete classes.

IMPORT_C TVersion Version( ) Const;

Returns the version of the RemCon server. This API is the only one (apart from Close) that can be called before Connect.

IMPORT_C Tint Connect( );

This is the standard session handle connection method. If handle creation is successful, a further IPC call is made to the RemCon server to set the 'type' of the client as either target or controller.

IMPORT_C Void Send(TRequestStatus& aStatus, TUid aInterfaceUid, TUint aOperationId, TUint& aNumRemotes, Const TDesC8& aData=KNullDesC8( ));

Send is used by 'targets' to send responses to commands, and 'controllers' to send commands.

When a target client sends a response it is sent on the bearer which transported the original command. This addressing is carried out by RemCon itself. aInterfaceUid contains the UID of the interface (core, or extension) to which the message belongs. aOperationId is the ID of the operation within that interface. aData is any associated data. If the client is a target (i.e. sending a response), and RemCon server does not remember having delivered a corresponding command to this client, the client will be panicked.

On completion, aNumRemotes contains the number of remotes the message was sent to. If the message is a response, or from a connection-oriented controller, this will be 1 on success and 0 on failure. If the client is a connectionless controller then aNumRemotes indicates, of the remotes the TSP requested the command be sent to, how many succeeded (at the bearer level). Note that the TSP may say to send the command to 0 remotes. This is not considered as an error but as a success case.

IMPORT_C Tint SendCancel( );

Cancels the client's interest in the completion of an asynchronous Send request.

IMPORT_C Void Receive(TRequestStatus& aStatus, TUid& aInterfaceUid, TUint& aOperationId, TDes8& aData);

Receive is used by targets to receive commands, and controllers to receive responses to commands.

Targets effectively receive commands from all bearers, subject to the TSP mechanism. Controller clients have responses delivered to them by virtue of RemCon remembering the controller which originated each command and the connection(s) over which a command went out.

IMPORT_C Tint ReceiveCancel( );

Cancels the client's interest in the completion of an asynchronous Receive request.

IMPORT_C Tint GetConnections (TSglQue<TRemConAddress>& aConnections);

Synchronous getter for the currently extant connections on all bearers.

TRemConAddress indicates the bearer (by its implementation UID) and bearer-specific connection information. If a connection is in the array, then it exists as a bearer-level connection in RemCon. If it does not exist in the array, then it does not exist as a bearer-level connection in the system. No other state is relevant. On success, the client is responsible for destroying the items in the queue.

IMPORT_C Void NotifyConnectionsChange(TRequestStatus& aStatus);

Notification for changes to the state of the bearer connections. On completion, the client preferably uses GetConnections to examine the actual connections.

IMPORT_C Tint NotifyConnectionsChangeCancel( );

Cancels the client's interest in the completion of a bearer connection state change notification.

Class RRemConController:Public RRemCon

This is the concrete controller session type.

IMPORT_C Tint GoConnectionOriented(Const TRemConAddress& aConnection);

Makes the controller connection-oriented, using the given address. This address is used to send all commands from this session, and all responses will come from this remote (or be generated by the corresponding bearer). Provided that there are no security-related problems with the client, RemCon completes GoConnectionOriented accordingly. This is the only security check that RemCon itself does, and it is all that stands between a connection-oriented client and a bearer. Each command is also 'permitted' by the TSP at send time.

IMPORT_C Tint GoConnectionless( );

Makes the controller connectionless, using the given remote. The TSP will be used to address each command sent.

IMPORT_C void ConnectBearer(TRequestStatus& aStatus);

A controller client may call this API to attempt to create a bearer-level connection using the TRemConAddress previously registered with GoConnectionOriented. This API can only be used by connection-oriented controllers.

IMPORT_C Tint ConnectBearerCancel ( );

Cancels the client's interest in the completion of a 'connect bearer' request.

IMPORT_C void DisconnectBearer(TRequestStatus& aStatus);

A controller client may call this API to attempt to destroy a bearer-level connection using the TRemConAddress previously registered with GoConnectionOriented. This API can only be used by connection-oriented controllers.

IMPORT_C Tint DisconnectBearerCancel( );
  Cancels the client's interest in the completion of a 'disconnect bearer' request.
class RRemConTarget:public RRemCon
  This is the concrete target session type.
TRemConAddress
  This is a simple type wrapping a UID (the bearer's implementation UID) and a narrow buffer to hold the bearer-specific connection information.
Intermediate Layer
class CRemConInterfaceSelector:public CBase
  This is a concrete class. It owns an RRemConController and an RRemConTarget session, and, for each, an Active Object maintaining a Receive request on the session. It is the heart of the client's interaction with RemCon. Clients instantiate a CRemConInterfaceSelector. Instances of the desired API interfaces are created, owned by the CRemConInterfaceSelector. They then open a controller and/or a target session (through the selector's API), and then either (a) send commands and wait for responses using the interface(s), or (b) wait for commands and send responses, also using the interface(s).
IMPORT_C void OpenControllerI( )
  Used by clients to open a controller session. It defaults to connectionless.
IMPORT_C void OpenTargetI( );
  Used by clients to open a target session.
  Other APIs are provided to wrap RRemCon*APIs.
Class CRemConInterfaceBase:Public CBase
  This is the base class for API interfaces, including the Core API.
Receiving Messages
    virtual void MrcibNewResponse(TUint aOperationId, canst TDesCB& aData)=0;
    virtual void MrcibNewCommand(TUint aOperationId, canst TDesCB& aData)=0;
  These are called by the intermediate layer when a message of the appropriate type comes in with the interface UID belonging to this instantiation of CRemConInterfaceBase.
Outer Layer
  The provided component includes a 'core' API outer layer DLL. It provides implementations of CRemConInterfaceBase, one for a controller client and one for a target client. It also provides a test 'extension' outer layer DLL to present Song Title and Absolute Volume APIs.
Converter
  Converters are plug-ins, implementing the interface, and are stateless.
    The API essentially consists of two functions
    a first function to convert from the bearer-specific to the interface-specific form
    a second function to convert in the opposite direction.
  It should be noted that a bearer is not obliged to use converters. It can hard-code all its conversion code. However this assumes that the bearer will know how to convert any future API extension. This is perfectly acceptable if the bearer is only going to support an already-existing set of messages, but for extensibility converters should preferably be used.
class CRemConConverterPlugin:public CBase
virtual Tint interfaceToBearer(TUid ainterfaceUid, TUint aOperationId, const TDesCB& aData, TRemConMessageType aMsgType, TDes8& aBearerData)const=0;
  Called by the bearer to convert interface-specific data (interface UID, operation ID, message type and data) to the bearer-specific (packaged) form.
virtual Tint BearerToInterface(const TDesCB& aBearerData, TUid& aInterfaceUid, TUint& aOperationId, TRemConMessage Type& aMsg Type, TDesB& aData) canst=0;
  Called by the bearer to convert bearer-specific data (packaged) to interface specific data (interfaceUID, operation ID, message type and data).
virtual TBool SupportedUids(const TUid& aInterfaceUid, canst TUid& aBearerUid)canst=0;
  Called by RemCon to find out if this converter converts between this interface and this bearer.
virtual TBool SupportedInterface(const TDesCB& aInterfaceData, canst TUid& aBearerUid) canst=0;
  Called by RemCon to find out if this converter converts between this interface and this bearer. aInterfaceData is the interface identifier in a bearer-specific format.
  Typical operational scenarios for the server system may be as follows:
Startup
Example Client Startup Code
  The client is obliged to do the following:
    CRemConInterfaceSelector*iInterfaceSelector=CRemConInterfaceSelector:NewL( );
  Then the client must create an instance of the interface which they want to use. For example, for an application wishing to act as a target, and using the Core API:
    CRemConCoreApiTarget*iCoreff=
    CRemConCoreApiTarget::NewL(*iInterfaceSelector, *this);
  where 'this' implements MRemConCoreApiTargetObserver. iCore/f is now owned by the interface selector, which is owned by the client.
  MRemConCoreApiTargetObserver has pure virtuals to inform the implementer when various incoming Core API commands are delivered.
  CRemConCoreApiTarget also has methods to allow the app to send responses to these commands.
  The client then needs to create a controller or target session. Only one of each may be created per instance of CRemConInterfaceSelector. Only one target may be connected per client process.
  Creating a controller session:
    iInterfaceSelector→OpenControllerL( );
  The controller session is opened in connectionless mode (any commands sent will be routed by the TSP). To make the controller connection-oriented, the following may be followed:
    TRemConAddress addr;
    addr.BearerUid( )=TUid::Uid(Ox1020453C);
    ||No bearer-specific connection data.
    iInterfaceSelector→GoConnectionOrientedL(addr);
  The client may wish to bring up a bearer-level connection at this time, to make the sending of the first command quicker:
    TRequestStatus stat;
    iInterfaceSelector→ConnectBearer(stat); User::WaitForRequest(stat);
  In the above example, the bearer with implementation UID Ox1020453C is used. This is the test serial bearer. Any commands sent by a connection-oriented controller are directed to the specific connection given in this call. To open a target session, the following is called:
    iInterfaceSelector→OpenTargetL( );
Server-Side
  The RemCon server is started in its own process by the connection of the first session (controller or target). If the server is already running, the session will simply be connected.

First, the singleton instance of CRemConServer is created. The first thing this server does after C++ construction is to register itself with the kernel via StartL, using its unique server name. If there is already an instance of the server running (due to a race condition triggered by more than one client side attempting to connect) StartL will leave and the nascent server will be destroyed cleanly. This ensures that there is only ever (at most) a single fully instantiated RemCon server in the system.

After StartL, the server sets about creating the following objects, with the associated actions:
 (a) Any operating system objects that may be needed, such as any required system logging objects or framework objects for plug-ins (such as Symbian's common object module).
 (b) A shutdown timer. This is used to terminate the server when there are no connected sessions. It is only initiated when the last session closes.
 (c) The singleton connection history object, to support GetConnections and NotifyConnectionsChange APIs.
 (d) The singleton instance of CBearerManager. Creation of the bearer manager should cause (in its ConstructL) all bearer plug-ins to be enumerated and instantiated. This causes connection-oriented bearers to start listening for incoming connections. The test serial (connectionless) bearer opens its COM port and immediately calls back with ConnectComplete, as if it had been asked to make an outgoing connection. If there are no bearer implementations in the system, RemCon will panic. This is because if this is a valid device configuration, then RemCon should also not have been implemented.
 (e) Five instances of CMessageQueue, used to log messages. There is one each for: outgoing commands pending addressing or permission-granting by the TSP; outgoing commands which have been sent (pending responses from remotes); incoming commands pending addressing by the TSP; incoming messages which are pending a client Receive request being posted; and incoming commands which have been delivered to controller sessions (awaiting responses from controllers).
 (f) The singleton instance of the converter manager. This makes one instance of each converter.
 (g) The singleton instance of the TSP. If there is not precisely one implementation of the TSP interface in the system, RemCon will panic. The TSP may perform any instantiation it wishes, but it is not expected by RemCon to do anything at all other than successfully return an object which can be used to address commands.

All of the above actions happen synchronously. From this point on, the system is successfully instantiated. Immediately after this, CActiveScheduler::Start is called in the server startup code, and any further actions occur asynchronously. These actions include:
 (a) A change to a connection over a bearer from the remote end. If an incoming connection arises, RemCon is told by the bearer. If a connection is dropped remotely, RemCon is also told. RemCon uses this information to complete client notifications.
 (b) Completion of a RemCon-initiated connect or disconnect request on a bearer for a specific connection. RemCon handles these in the same way as remotely-triggered connection changes. Connect and disconnect requests are initiated by the client. When RemCon wants to send a message over a particular connection, it does not check that it exists first (as long as the bearer exists)-Remcon just gives the message to the bearer and leaves the bearer to deal with the message.
 (c) An incoming message from a bearer.
 (d) An incoming client request. If the client closes its session, then, if it is the last session, the server will begin to shut down. A typical 'Shutdown' scenario is message, then the message will be addressed by the TSP or explicitly by the client (if it is connection-oriented).

Shutdown

To disconnect from RemCon, the client must delete any interface objects and then the interface selector. Closure of the last open session triggers the shutdown of the server.

Whenever a session closes, its destructor is called. This unconditionally informs the server of the event, which removes any commands belonging to that session from the queues and keeps track of the number of open sessions. If the number of open sessions falls to zero, then the shutdown timer is started. When the shutdown timer fires, the server terminates itself by calling CActiveScheduler::Stop. If any new sessions arrive (at any time) the shutdown timer is cancelled, making sure that the server is not terminated when a session is requested.

When CActiveScheduler::Stop is called, execution returns to the server startup code after the call to CActiveScheduler::Start. The server object is destroyed immediately. The following events also occur in the following order:
 (a) The bearer manager is destroyed. This cancels all outstanding requests on the bearers and destroys them synchronously. Destruction of a bearer is arranged to operate cleanly, closing connections and cancelling self-requests on their service providers appropriately.
 (b) The shutdown timer can be safely destroyed at this time.
 (c) The arrays of messages are destroyed.
 (d) The TSP is destroyed. However, there may be a request outstanding on it, for instance if there is an incoming command which is currently being addressed by the TSP. Hence, the TSP is arranged to cancel any outstanding requests and self cleanse at this time.
 (e) The converter manager is destroyed. It destroys all the converter instances.
 (f) The connection history object is destroyed.
 (g) Any operating system objects that were created are also now destroyed.

Destruction of the server, once it has started, is irrevocable. If a client tries to connect while server shutdown is occurring the kernel will complete the client's attempt to connect with an error. In this circumstance, the client side will then restart the server and again try to connect.

Outgoing Command and Incoming Response

An outgoing command scenario may start with a controller client sending a command, using an API provided by an instantiated interface, for example:
 TRequestStatus stat; iCoreIf→Play(stat);
 User::WaitForRequest(stat);

The Core API translates the Play (for example) request into a generic 'operation ID' and associated data (e.g. play speed). It passes this data to the intermediate layer with its interface UID. The intermediate layer uses its controller session to send the message to the server.

The server examines the controller session. A CRemConMessage is constructed containing the connection address (if the controller is connection-oriented), interface UID, operation ID, associated data, message type (command or response), and the ID of the originating session.

If the session is a connection-oriented controller, then this message is placed on the 'outgoing pending access to the TSP' queue and given to the TSP for permission-granting. If permission is given, the message is placed on the 'outgoing sent' queue and delivered to the correct bearer with the given connection address. The bearer indicates synchronously its acceptance of this request-if it errors then the message is removed from the 'outgoing sent' queue. The client's send request is completed immediately. If permission is denied by the TSP then the client's request is completed with KErrPermissionDenied.

If the controller is connectionless, then the message is placed on the 'outgoing pending access to the TSP' queue and given to the TSP for (possibly asynchronous) addressing. When the TSP completes the address request the message is removed from the 'outgoing pending access to the TSP' queue and N copies are inserted on the 'outgoing sent' queue, one for each address indicated by the TSP, and also sent N times to the correct bearer with the relevant addressing information. Any error up to this point rolls back the queues and errors the client. The purpose of the TSP in this scenario is essentially to populate the connection address field of the message in order for it to be sent.

At some later point, a remote may send a response to a command that has been sent. The remote address, interface UID and operation ID of the response are checked against the 'outgoing sent' queue. If a matching item is found, the source session ID of the originating command is used to address the incoming response to a client controller. If a matching command is not found, the response is dropped. The response is used to complete a client Receive request and the 'outgoing sent' queue is cleansed of the command, which has now been matched up. It should be noted that the intermediate layer (CRemConInterfaceSelector) maintains an outstanding Receive request on any connected controllers or targets it has. The 'incoming pending Receive' queue may be used to queue both responses and commands when the client does not have a Receive request outstanding.

On the client side, the new response is delivered by the server to a specific controller session. The owning interface selector switches on the interface UID and calls NewResponse on the interface. The interface examines the operation ID and optionally decomposes the associated data, and, for example, calls PlayResponse on the observer (the client).

In summary, the client makes an asynchronous request to send a command. The request is completed, and at a later time the client has PlayResponse called on it.

If the TSP directs a Play command to multiple remotes, and they each generate a response, PlayResponse will end up being called on the client multiple times.

Incoming Command and Outgoing Response

This scenario starts with a bearer delivering an incoming command to RemCon. RemCon creates a CRemConMessage containing the remote address, interface UID, operation ID, associated data, and message type (command or response). This message is placed in the 'incoming pending address' queue and sent to the TSP for addressing.

The purpose of the TSP in this scenario is essentially to populate the session ID field of the address. Once this is done, the message is removed from the 'incoming pending address' queue and N copies added to the 'incoming delivered' queue, and each is delivered to the relevant target client: the 'incoming pending Receive' queue may be used if the client does not have a Receive request outstanding when the command arrives at the session. The intermediate layer checks the interface UID, forwarding the message to the correct interface object. The interface decomposes the message and calls, for instance, Play on the client, indicating that a Play command has been received.

The client may choose to send a response. It calls PlayResponse, which sends a message to RemCon via the intermediate layer's target session. The server checks the 'incoming delivered' queue for commands matching the session ID, interface UID and operation ID, and uses the remote address of the found command to address the response to the correct bearer. The found command is removed from the queue and destroyed.

A remote control client application may be implemented as follows. This scenario involves implementing a client of the remote control system, using the existing remote control APIs.

Firstly, it is decided whether the application is for a controller or a target. If it is required to remote control other devices, a controller application is required. If it is required to be remote controlled, a target application is required. It is permitted to be both a controller and a target at any one time.

If a controller is required, is it necessary to know which remote to communicate with, and over which bearer. If this information is known, then the application may operate in connection-oriented mode, where the remote control system is explicitly told the bearer and the remote's address. If this information is not known, then it is required to operate in connectionless mode (the default). In this case, commands are routed by the system (specifically, by the Target Selector Plug-in as provided by the device manufacturer.

It is then necessary to decide which APIs are required to be used. The Core API is provided, which covers many basic operations including Play, Stop, etc. (TrackInfo and Absolute Volume APIs are also provided, but without the lower-level implementations required to be able to send and receive such messages over Bluetooth.)

The controller set up will now be described.

The first step is to create an instance of CRemConInterfaceSelector. This is the heart of the client side, owning sessions on the server and interface objects, and routing messages between them.

CRemConInterfaceSelector*sel=CRemConInterface
    Selector:NewL( );

Next an instance of the controller interface of the desired API is created (in this example the Core API).

CRemConCoreApiController*cont=
CRemConCoreApiController::NewL(*this, *sel);

This code assumes that this is an object of a type which implements MRemConCoreApiControllerObserver. This code assumes that this is an object of a type which implements. This mixin determines how incoming responses (to your commands) are delivered. Ownership of cont now resides with sel It is now necessary to tell the interface selector to connect a controller session with the server.

sel→OpenControllerL( );

At this point, the controller session is connectionless. Any commands sent will be addressed by the TSP. If the bearer and remote which are to be controlled are known, then the following code may be used:

```
TRemConAddress addr;
addr.BearerUid( ) =      xxx; II xxx=the bearer's UID
addr.Addr( ) = yyy; II the yyy=remote's address in
bearer-specific form
sel->GoConnectionOrientedL(addr);
```

Once GoConnectionOrientedL succeeds, the application is connection-oriented, and the controller session is dedicated to communicating with the single remote specified. The TSP does not address specific commands, but still permits or denies each command sent. Note that no bearer-level connection with the remote is established by this operation.

It is possible to become connectionless again using sel→GoConnectionlessL( );

Once connection-oriented, to reduce the latency of the first command sent, it is possible to explicitly set up a bearer-level connection with the remote as follows:

TRequestStatus stat;
sel→ConnectBearer(stat); User::WaitForRequest(stat);

If this is not done, the server will attempt to bring up a connection as required, when the first (and any subsequent) command is sent. ConnectBearer is provided as a facility to reduce latency.

The bearer-level connection can be pulled down as follows:

TRequestStatus stat;
sel→DisconnectBearer(stat);
User::WaitForRequest(stat);

It is worth noting that bearer-level connections should not be controlled arbitrarily. It is only possible to control the bearer-level connection on which the application is currently 'connection-oriented'. This is the reason for the lack of a TRemconAddress parameter in ConnectBearer and DisconnectBearer.

It should also be noted that the remote may bring up or down the application connection at its own behest. If a remote pulls down the connection, then the next command sent will cause the server to try to pull it back up again. This may entail an unexpected delay. If the re-connection fails, the send will be failed. Despite all this, the application will remain connection-oriented: orientation of connection is independent of any actual bearer-level connection.

If the state of connection, at the bearer level, is considered of interest, the following APIs on CRemConinterfaceSelector may be used:

IMPORT_C Tint GetConnections (TSglQue<TRemConAddress>& aConnections);
IMPORT_C void NotifyConnectionsChange(TRequestStatus& aStatus);
IMPORT_C TInt NotifyConnectionsChangeCancel( );

GetConnections supplies all the currently extant connections in the system. NotifyConnectionsChange just indicates when that set has changed.

Sending Commands and Receiving Responses cont can now be used to send commands as follows.
TRequestStatus stat;
cont→Play(stat);
User::WaitForRequest(stat);

Responses are delivered via the MRemConCoreApiControllerObserver interface.

Only one command send can be outstanding at any time. If a connectionless controller is being implemented, the TSP may have addressed the command to multiple remotes. In this case, a single command send may result in multiple responses, and these are filtered or used as considered appropriate.

If the TSP has sent the command to multiple remotes, and one or more of those sends fails, an error value will be provided from one of the failed sends. The number of remotes to which the command was successfully sent is also provided. Bearers are obliged to give back a response to each command they send. Depending on the bearer, this response may or may not have actually come from the remote. A send either succeeds or fails at the bearer level—either the bearer takes responsibility for sending or it does not. Hence even a 'successful' send may not actually result in a transmission to the required remote.

Note that each command sent to a remote involves memory being allocated in the server's heap, which is only released on client closure or when a response is received. If there is good reason to believe that any remote for which communication is not required is no longer present then it is preferably arranged to stop sending commands to that remote in order to reduce the load on the memory in the server.

Tear-Down

To clean up the involvement in the remote control system, all outstanding asynchronous requests should be cancelled and the interface selector should be deleted.

Target

Setup

This is very similar to the controller setup, except that there is no concept of connection-orientation. Targets implement a mixin through which the interface selector delivers incoming commands, and instantiates an object to send responses. All incoming commands are addressed by the TSP. Outgoing responses are addressed implicitly to the remote from which the originating command came.

CRemConinterfaceSelector*sel=
CRemConinterfaceSelector::NewL( );
CRemConCoreApiTarget*targ=
CRemConCoreApiTarget::NewL(*this, *sel);
Ownership of targ now resides in sel.
The client now opens a target session on the server.
sel→OpenTargetL( );

Receiving Commands and Sending Responses

Incoming commands are given via (in the above case) the MRemConCoreApiTargetObserver mixin.

Having received a command, it is required to send a response.

TRequestStatus stat;
cont→PlayResponse(stat, response);
User::WaitForRequest(stat);

Only one response can be outstanding at any time. If commands come in quickly, it is necessary to queue responses to them. However, it should be remembered that each command delivered to a target involves memory allocated in the server's heap, which is only released on client closure or when a response is sent.

Tear-Down

To clean up involvement in the remote control system, all outstanding asynchronous requests should be cancelled and the interface selector should be deleted.

A new remote control API may be implemented as follows.

To implement a new API, two pieces of work need to be undertaken: the creation of an outer-layer DLL, and the creation of a family of converters.

Outer-Layer DLL

The jobs of an outer-layer DLL are:
(a) to present to the client a friendly API,
(b) to convert between fields/terms in the client API and the DLL's internal data format (this will include both operation IDs and the layouts of fields of operation-specific data), and (c) to publish as much of the above as is needed to (i) empower clients to use the API, and (ii) empower implementers of converters.

Following the pattern established in the Core API, the following steps may be followed:
create a static DLL linking against remconinterfacebase.lib.
allocate a new UID for the API.
define a class for each of the controller and target types in the new API, each deriving from CRemConinterfaceBase.
Provide NewL and destructor methods, and public exported methods—for the controller, to send commands, and, for the target, to send responses.
Define observer mixins for each of the controller and target, for the client to be informed of incoming responses and commands respectively.
In each of the interfaces, CRemConInterfaceBase::MrcibNewMessage can be implemented to decode an incoming message and call the correct mixin method.
Specify operation identifiers, and the format of each message in the API. These will be used to create converters.

Converters

When a client sends a message using an outer-layer DLL, a bearer receives the following information: the UID of the API the message came from, the operation ID of the message, and a descriptor containing any operation-specific data. It is the job of the converter to convert between the data format in the operation-specific data and the format required by the bearer.

The Converter API is in remotecontrol\converterplug-in\public (but actually #include from epoc32\include\remcon). The Core_Serial converter is in remotecontrol\test\converters\Core_Serial.

Following the pattern established in the Core Serial converter, a new implementation UID should be allocated for the converter, implementing the Converter API as an ECOM plug-in.

CRemConConverterPlug-in::SupportedUids (const TUid& aInterfaceUid, const TUid& aBearerUid) should be implemented in order to determine whether or not conversion of message formats between the given API and the given bearer are supported.

CRemConConverterPlug-in::Supportedinterface(const TDesC8& aInterfaceData, const TUid& aBearerUid) is then implemented to answer the same support question, except posed in a slightly different way. In this case, the API is identified by a package in the format of the given bearer. The remaining converter implementation is relatively straightforward.

Converters are stateless synchronous data-processing machines. To do the conversion, the converter has to know the operation IDs of the API, and the API's UID.

However, a bearer must explicitly request the help of a converter to 'understand' a message. If the bearer does not, then no converter will be invoked—the bearer is essentially closed to APIs beyond those it already knows how to do the conversion for. This may be perfectly valid, depending on the bearer.

If however a new API is being implemented, a converter must be provided for each existing bearer. If this information is not provided, then the framework is effectively failing to inform a bearer of how to convert messages between its format and the format of the new API: in essence, this is tantamount to saying that the new API cannot be used over that particular bearer. This too may be fine, depending on the particular framework requirements.

A converter needs not only formatting information published by the API, but also formatting information from the bearer. In the nature of things, however, bearer formats are more likely to exist as published specifications (e.g. AVRCP) than are proprietary remote control APIs.

A TSP may be implemented s follows.

Firstly, a plug-in implementing the TSP API is implemented, with a new implementation UID.

The TSP should be prepared so that it can answer the following questions:
(a) to which currently-connected (i.e. connected to the server) target clients should the server deliver the following incoming command (with an interface UID and operation ID, and a collection of information about the target clients, including their secure IDs)
(b) to which remote(s) should the server deliver the following outgoing command (with an interface UID and operation ID, information about the controller client trying to send the command, including its secure ID and its RMessage2, and a collection of TSecurityPolicys for the bearers).

It should be remembered that if the TSP gives a command to client X then it is effectively empowering client X to send precisely one response over the bearer which delivered the originating command.

There must be only one such DLL in ROM.

A new remote control bearer can be implemented as follows.

A plug-in implementing the bearer API is created, with a new implementation UID.

The bearer API is connection-oriented. All messages sent and delivered are associated either with a specific recipient address or a specific sender address.

The server is responsible for bringing up a bearer-level connection to a particular remote before issuing a bearer-level send to that remote.

Real bearers may not in fact be connection-oriented. For example, the test serial bearer simply works over a serial cable. Therefore, (a) it has no bearer-specific remote address format (so 'remote addresses' simply consist of the serial bearer's UID), and (b) it has to emulate connection-oriented behaviour by 'indicating' an incoming connection essentially on start-up, when it first opens the serial port. This 'connection' never goes down.

Bearers are instantiated at server start-up time, and should immediately start listening for incoming connections. Each connection is indicated up to the server.

It can be seen from the above description that the present invention provides a generic remote control framework which provides significant advantages over current non generic frameworks, including:—
facilitating the creation of applications that can be remotely controlled. Because existing remote control solutions are invariably tied to one bearer technology, it has not hitherto been possible to provide an application for generic remote control, unless the application was developed to utilise specific bearer technologies involved.
The ability for device manufacturers to release aftermarket accessories using new technologies were not catered for at device manufacture time. Without this invention, any such accessories would need to ship with a new version of any controllable applications.
The ability to have multiple controllable applications running concurrently on the device: in cases where more than one application exists it provides a mechanism for selecting one of a number of possible target applications.

Although the present invention has been described with reference to particular embodiments, it will be appreciated that modifications may be effected whilst remaining within the scope of the present invention as defined by the appended claims.

One possible example of such a modification of this invention is applicable to a computing device with multiple audio applications, all of which have registered to receive remote control commands. Such a device with multiple audio applications may comprise a mobile telephone with many multimedia applications capable of playing audio data, such as an MP3 player, a radio, a browser plug-in which can play streamed audio from the internet, a voice memo or dictation application, and a local voicemail store.

Where all of these applications have registered to receive remote control commands, this embodiment would enable correct delivery of such commands in the case where one application was already playing audio by enabling the remote control manager to deliver remote control commands on such a device to the application which is already playing audio.

The invention claimed is:

1. An apparatus providing multiple applications, configured to:
   run multiple applications concurrently, wherein the multiple applications are configured to be remotely controlled by a same controller device;
   receive a command from the controller device over a remote control bearer, the command as received over the bearer being applicable to more than one of the multiple applications;
   select at least one of the multiple applications based on a predetermined policy comprising an operation state of the at least one of the multiple applications, the operation state being one or both of a recent history of user operations, and whether the at least one of multiple applications is in an active state; and
   deliver the command to the selected at least one of the multiple applications.

2. An apparatus according to claim 1, wherein the apparatus is configured to receive the command from the controller device using a bearer plug-in corresponding to the remote control bearer.

3. An apparatus according to claim 2, wherein the bearer plug-in comprises one of Bluetooth audio video remote control profile (AVRCP) plug-in, wired headset plug-in and infrared remote control plug-in.

4. An apparatus according to claim 1, wherein the apparatus is configured to receive the command from the controller device using a protocol set corresponding to the remote control bearer.

5. An apparatus according to claim 4, wherein the remote control bearer comprises one of Bluetooth, WLAN, Infrared and wired bearers.

6. An apparatus according to claim 1, wherein the apparatus is configured to select at least one of the multiple applications to receive the command using a target selector plug-in.

7. An apparatus according to claim 1, wherein the apparatus is configured to deliver the command to the selected one of the multiple applications through an application programming interface (API).

8. An apparatus according to claim 1, wherein the predetermined policy further comprises at least one of application order in the Read Only Memory (ROM) of the apparatus, relative deemed importance of applications, and user preference determined based on user behaviors.

9. An apparatus according to claim 1, wherein the at least one of multiple applications comprises a media player application, and the active state for the media player application comprises a playing state.

10. An apparatus according to claim 1, wherein the at least one of multiple applications comprises a media player application and a phone application, the active state for the media player application comprises a running state, and the active state for the phone application comprises an active phone call;
   wherein, responsive to both an active phone call and the media player application in a running state, the apparatus is configured to select the phone application for delivery of the command.

11. An apparatus according to claim 1, wherein the apparatus comprises a mobile phone.

12. An apparatus according to claim 10, wherein the apparatus is further configured to:
   provide a first volume control user interface associated with the phone application for display;
   provide a second volume control user interface associated with the media player application for display; and
   upon selection of the phone application for delivery of a command related to volume control changes, update the first user interface responsive to the received command.

13. An apparatus providing multiple applications, configured to:
   run multiple applications concurrently, wherein the multiple applications are configured to be remotely controlled by a controller device and comprise one or more audio applications;
   receive a command from the controller device over a remote control bearer, the command as received over the bearer being applicable to more than one of the multiple applications;
   select at least one audio application that is playing audio based on a predetermined policy comprising an operation state of the at least one of the multiple applications, the operation state being one or both of a recent history of user operations, and whether the at least one of multiple applications is in an active state; and
   deliver the command to the selected at least one audio application.

14. An apparatus according to claim 13, wherein the apparatus is configured to receive the command from the controller device using a bearer plug-in corresponding to the remote control bearer.

15. An apparatus according to claim 14, wherein the bearer plug-in comprises one of Bluetooth audio video remote control profile (AVRCP) plug-in, wired headset plug-in and infrared remote control plug-in.

16. An apparatus according to claim 13, wherein the apparatus is configured to receive the command from the controller device using a protocol set corresponding to the remote control bearer.

17. An apparatus according to claim 16, wherein the remote control bearer comprises one of Bluetooth, WLAN, Infrared and wired bearers.

18. An apparatus according to claim 13, wherein the apparatus is configured to select at least one audio application to receive the command using a target selector plug-in.

19. An apparatus according to claim 13, wherein the apparatus is configured to deliver the command to the selected at least one audio application through an application programming interface (API).

20. An apparatus according to claim 13, wherein the apparatus comprises a mobile phone;
   wherein the one or more audio applications comprise a media player application and a phone application;
   wherein the active state of the media player application is a playing state, and the active state of the phone application is a phone call being active;
   and wherein responsive to both a phone call being active and the media player application in its playing state, the apparatus is configured to select the phone application for delivery of the command.

21. An apparatus according to claim 20, wherein the apparatus is further configured to:
   provide a first volume control user interface associated with the phone application for display;
   provide a second volume control user interface associated with the media player application for display; and
   upon selection of the phone application for delivery of a command related to volume control changes, update the first user interface responsive to the received command.

* * * * *